US012769231B1

(12) United States Patent
Kawai et al.

(10) Patent No.: US 12,769,231 B1
(45) Date of Patent: Oct. 20, 2026

(54) FIXING DEVICE

(71) Applicant: CANON KABUSHIKI KAISHA, Tokyo (JP)

(72) Inventors: Hiroki Kawai, Chiba (JP); Ikuo Nakamoto, Chiba (JP); Shohei Tsuzaki, Chiba (JP); Misa Kawashima, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 19/008,510

(22) Filed: Jan. 2, 2025

(30) Foreign Application Priority Data

Feb. 29, 2024 (JP) ................................ 2024-030722

(51) Int. Cl.
*G03G 15/20* (2006.01)

(52) U.S. Cl.
CPC ..... *G03G 15/2017* (2013.01); *G03G 15/2064* (2013.01)

(58) Field of Classification Search
CPC ........... G03G 15/2017; G03G 15/2064; G03G 15/206; G03G 2215/2035; G03G 2215/2003
See application file for complete search history.

(56) References Cited

U.S. PATENT DOCUMENTS

| | | | | |
|---|---|---|---|---|
| 11,156,948 | B2 | 10/2021 | Tanaka et al. | |
| 2009/0208263 | A1 | 8/2009 | Hanyu | |
| 2017/0176905 | A1* | 6/2017 | Suzuki ............... | G03G 15/2053 |
| 2020/0103798 | A1 | 4/2020 | Tanaka et al. ..... | G03G 15/2053 |

FOREIGN PATENT DOCUMENTS

| | | | |
|---|---|---|---|
| JP | 2018-063397 | * | 4/2018 |
| JP | 2020-052354 | | 4/2020 |
| JP | 2023-125020 A | | 9/2023 |

OTHER PUBLICATIONS

Co-pending U.S. Appl. No. 19/026,064 to Kawashima et al., filed Jan. 16, 2025.
Extended European Search Report dated Jun. 13, 2025 in counterpart European Patent Appln. No. 25150432.0.

* cited by examiner

*Primary Examiner* — Sandra Brase
(74) *Attorney, Agent, or Firm* — Venable LLP

(57) ABSTRACT

A fixing device includes an endless belt and a contact member contacting an inner surface of the belt in a nip. The contact member includes projections provided on a side where the contact member slides with the belt and to project toward the inner peripheral surface. The projections distribute on and outside the nip in a widthwise direction of a recording material. When in a region where the projections exist, a predetermined region outside the nip in the widthwise direction is a first region, and a region inside the first region and inside the nip is a second region, an area ratio of an contacting area of the belt and the projections in the first region to an area of the first region is larger than an area ratio of an contacting area of the belt and the projections in the second region to an area of the second region.

15 Claims, 10 Drawing Sheets

(a)

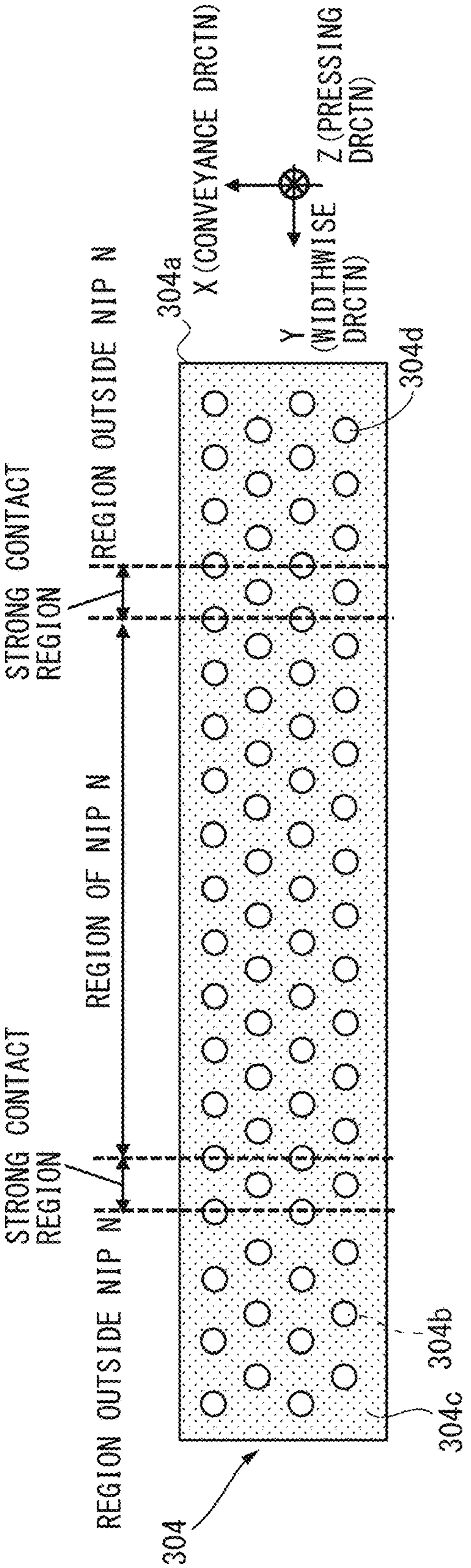

(b)

<table>
<tr><td>LEVEL</td><td>1</td><td>2</td><td>3</td><td>4</td><td>5</td><td>6</td><td>7</td><td>8</td><td>9</td><td>10</td><td>11</td><td>12</td></tr>
<tr><td>AREA RATIO OF STRONG CONTACT REGION [%]</td><td colspan="6">3.2</td><td colspan="6">30</td></tr>
<tr><td>AREA RATIO OF REGION OF NIP N [%]</td><td>3.2</td><td>5</td><td>10</td><td>15</td><td>20</td><td>30</td><td>3.2</td><td>5</td><td>10</td><td>15</td><td>20</td><td>30</td></tr>
</table>

Fig. 8

FIXING DEVICE

FIELD OF THE INVENTION AND RELATED ART

The present invention relates to a fixing device which fixes a toner image carried on a recording material to the recording material.

As a fixing device, a configuration, in which a nip portion for nipping and conveying is formed by a belt and a nip portion forming member such as a roller and the recording material passing through the nip portion is heated and pressed, is conventionally known. In addition, in this configuration, by a sliding member being slid with an inner peripheral surface of the belt in the nip portion, the nip portion is formed between the belt and the nip portion forming member.

In order to guarantee quality of an image to be fixed to the recording material, in the fixing device, it is required to suppress slippage between the recording material, which is conveyed by the nip portion, and the belt and between the recording material and the nip portion forming member. For this reason, it is required that frictional force between the belt and the sliding member is made to be less than these frictional force between the recording material and the belt and between the recording material and the nip portion forming member. In particular, in a configuration which includes a wide nip, in which a width of the nip portion is widened to increase heating efficiency, it is required that the frictional force between the belt and the sliding member is made to be less.

For example, in Japanese Patent Application Laid-Open No. 2020-052354, a configuration, in which irregularities are formed on a sliding sheet, which slides with an inner peripheral surface of a belt in a nip portion to reduce frictional force between the sliding sheet and the belt, is disclosed.

SUMMARY OF THE INVENTION

According to an aspect of the present invention, there is provided a fixing device for fixing a toner image carried on a recording material to the recording material, the fixing device comprising: an endless and rotatable belt; a rotatable pressing member configured to contact an outer peripheral surface of the belt and form a nip portion for nipping and conveying the recording material between itself and the belt; and a contact member configured to contact an inner peripheral surface of the belt in the nip portion, wherein the inner peripheral surface of the belt slides with the contact member, wherein the contact member includes a plurality of projections provided on a side where the contact member slides with the belt and so as to project toward the inner peripheral surface of the belt, the plurality of the projections distributing on the nip portion and outside the nip portion with respect to a widthwise direction of the recording material crossing a conveyance direction of the recording material, and wherein when in a region where the projections of the contact member exist, a predetermined region outside the nip portion in the widthwise direction crossing the conveyance direction of the recording material is defined as a first region, and a region inside the first region in the widthwise direction and inside the nip portion is defined as a second region, an area ratio of a contacting area where the belt and the plurality of the projections are in contact with each other in the first region to an area of the first region is larger than an area ratio of an contacting area where the belt and the plurality of the projections are in contact with each other in the second region to an area of the second region.

Further features of the present invention will become apparent from the following description of exemplary embodiments with reference to the attached drawings.

Figure 1:
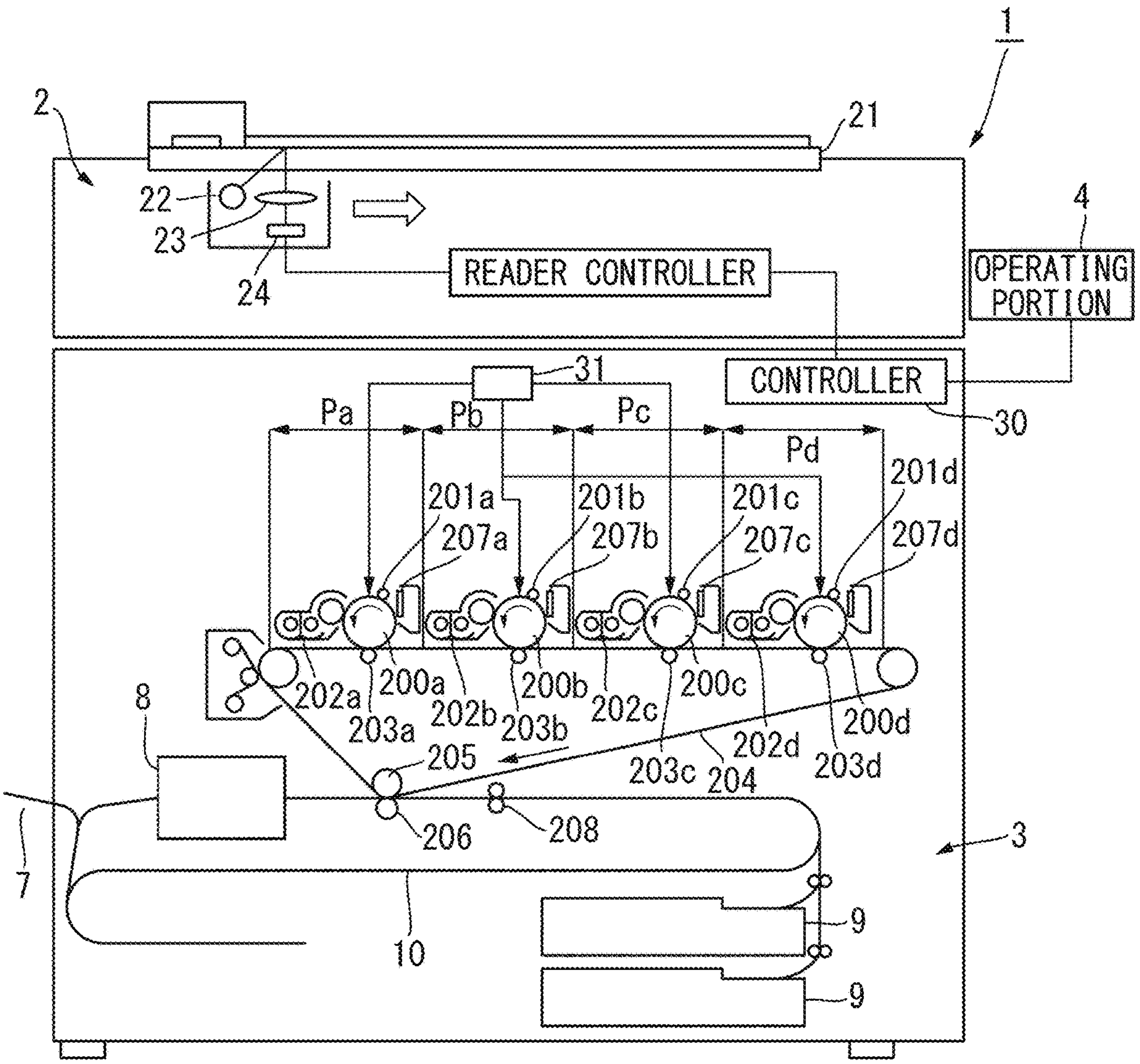
FIG. 1 is a cross-sectional view of an outline configuration of an image forming apparatus according to an Embodiment 1.
Figure 2:
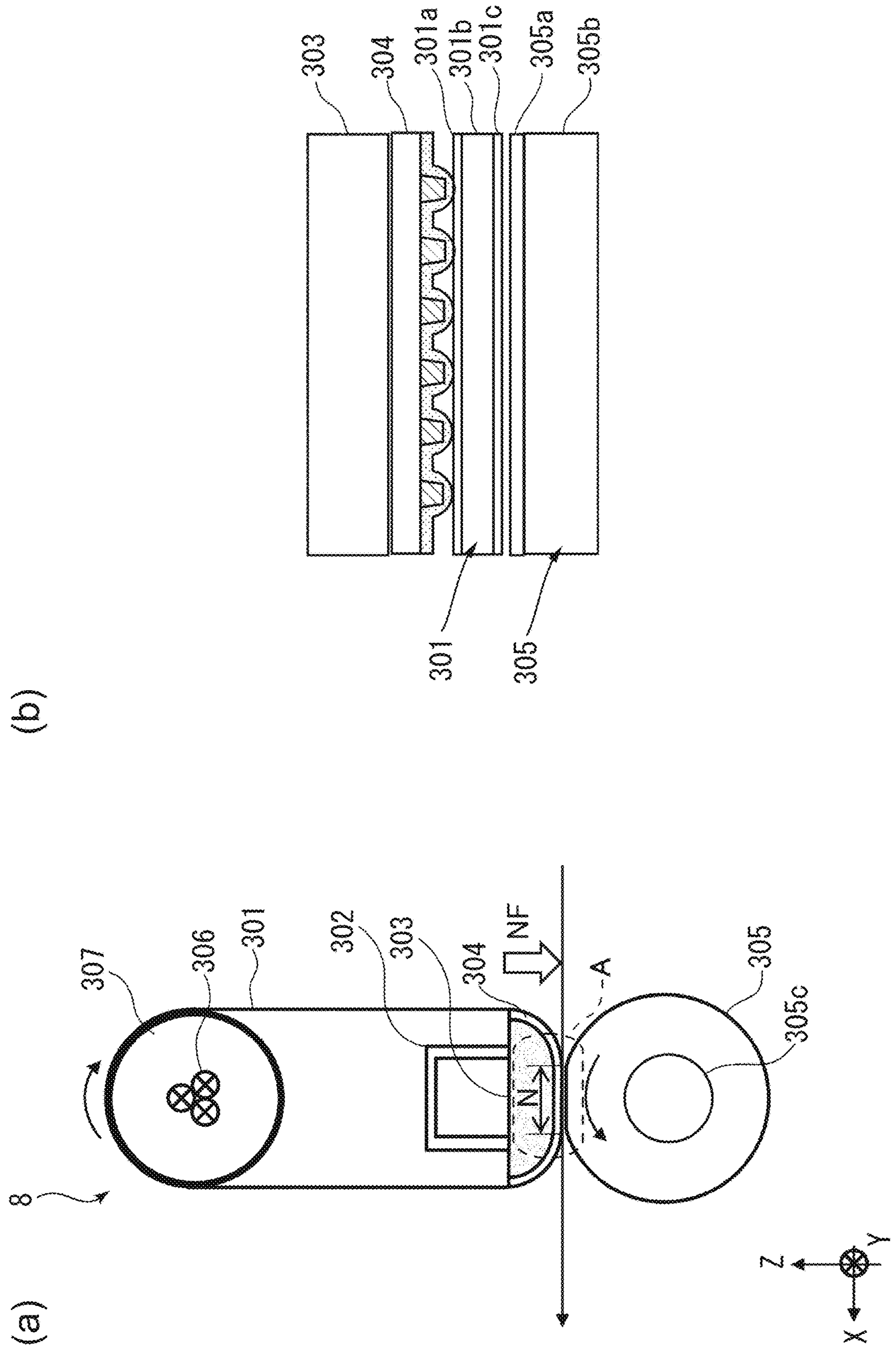

Part (a) of FIG. 2 is a cross-sectional view of an outline configuration of a fixing device according to the Embodiment 1, and part (b) of FIG. 2 is a schematic view illustrating an enlarged portion A in part (a).

Figure 3:
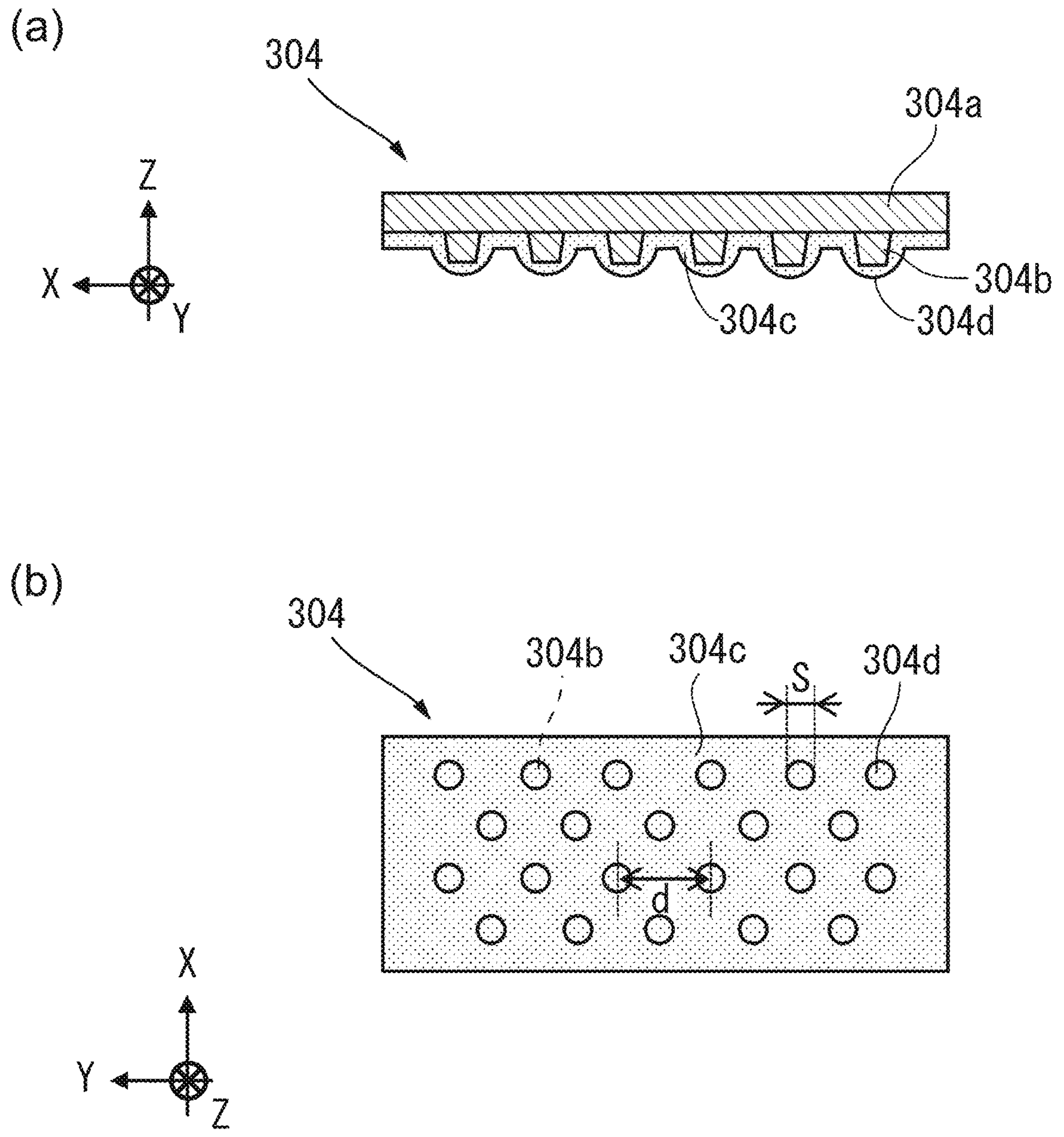

FIG. 3 includes a cross-sectional view in part (a) and a plan view in part (b), which schematically illustrate a sliding member according to the Embodiment 1.

Figure 4:
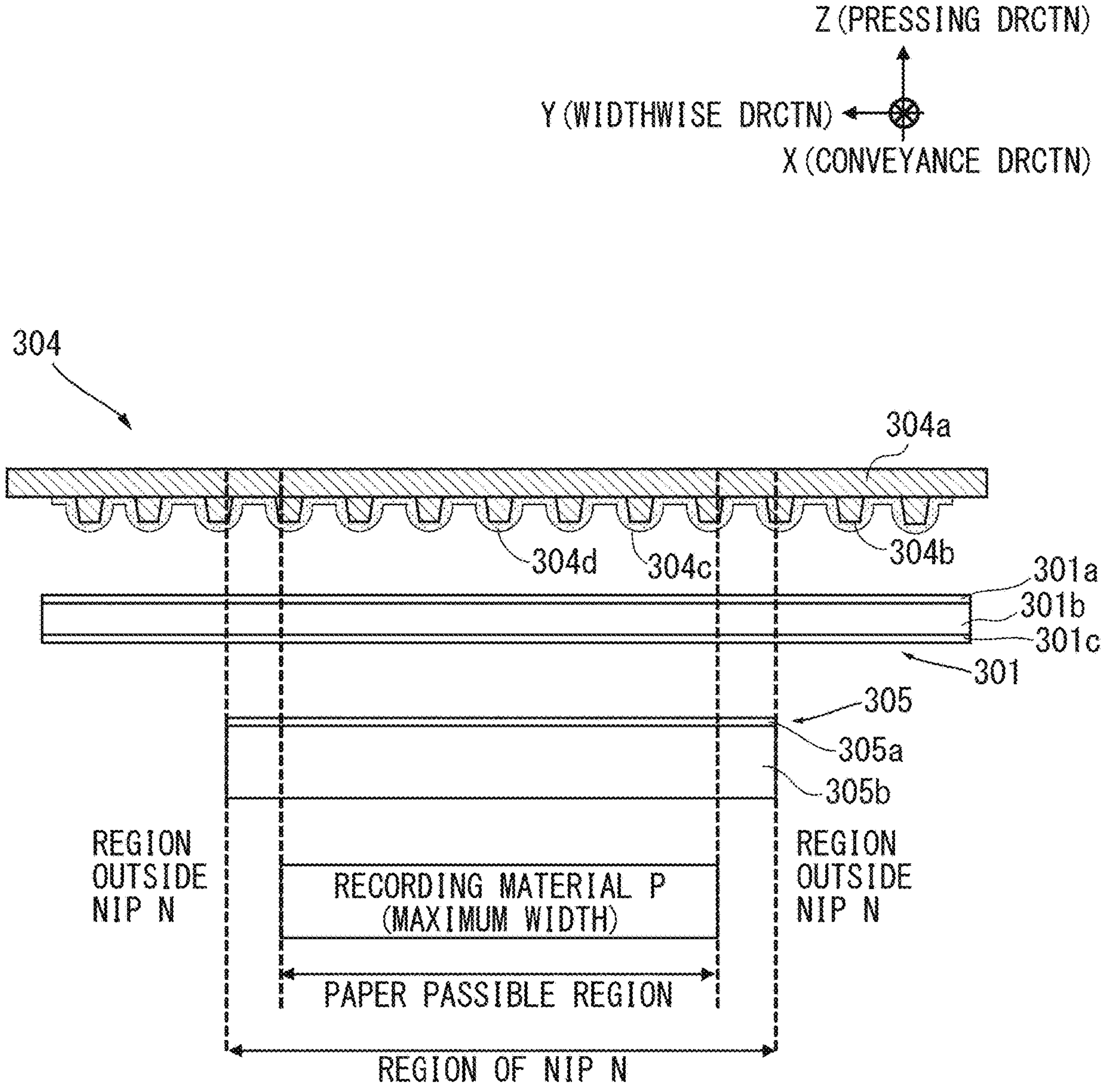

FIG. 4 is a schematic view in which the sliding member, a belt and a pressing roller according to the Embodiment 1 are cut along a widthwise direction.

Figure 5:
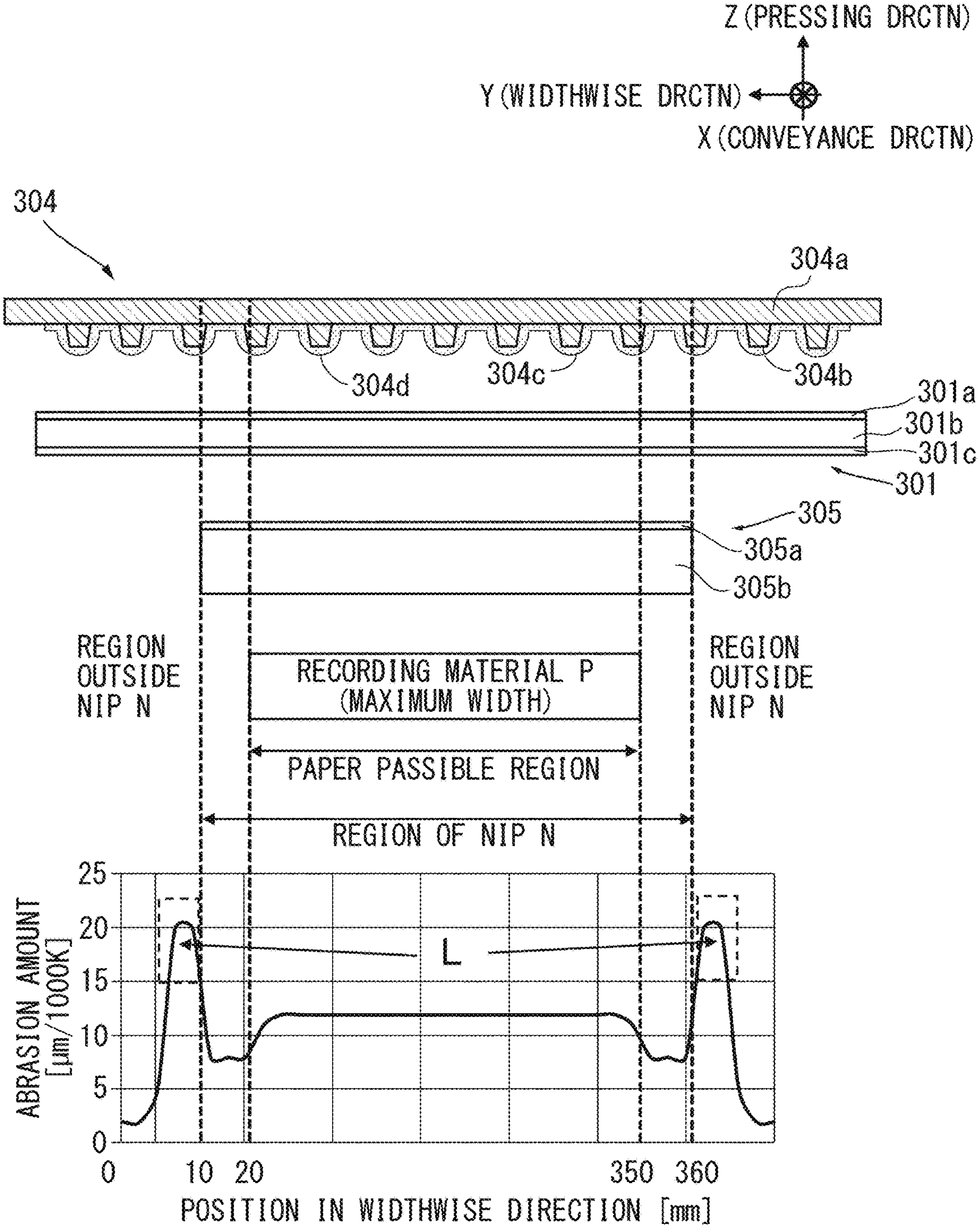

FIG. 5 is a view illustrating a graph showing relationship between an amount of wear (abrasion) of a sliding layer of the sliding member in the widthwise direction together with the schematic view in which the sliding member, the belt and the pressing roller are cut along the widthwise direction.

Figure 6:
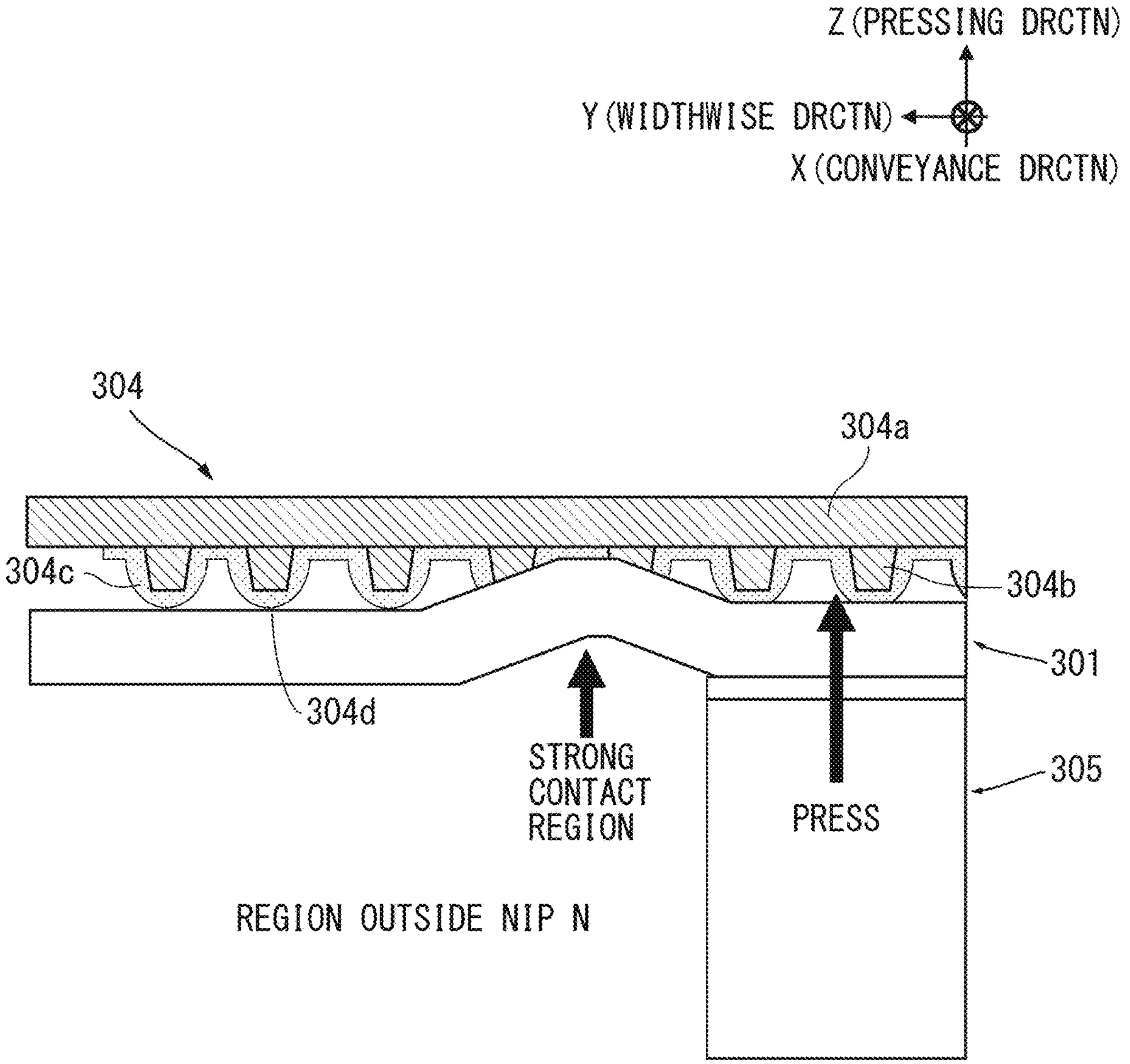

FIG. 6 is a schematic view in which a region, where a part of the belt makes strong contact to the sliding member according to the Embodiment 1, is cut along the widthwise direction.

Figure 7:
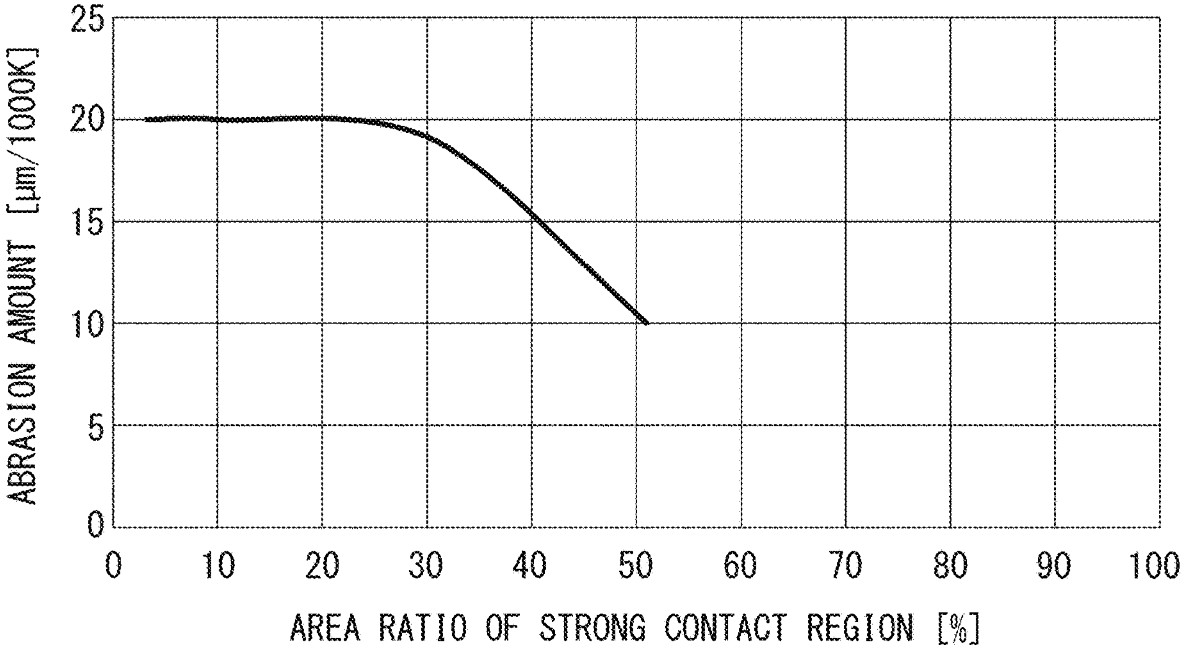

FIG. 7 is a graph illustrating relationship between an area ratio of a strong contact region and the amount of wear according to the Embodiment 1.

Part (a) of FIG. 8 is a schematic view illustrating each region on a surface of the sliding member according to the Embodiment 1, and part (b) of FIG. 8 is a table showing conditions of the sliding member used in an experiment for sensitivity of driving torque.

Figure 9:
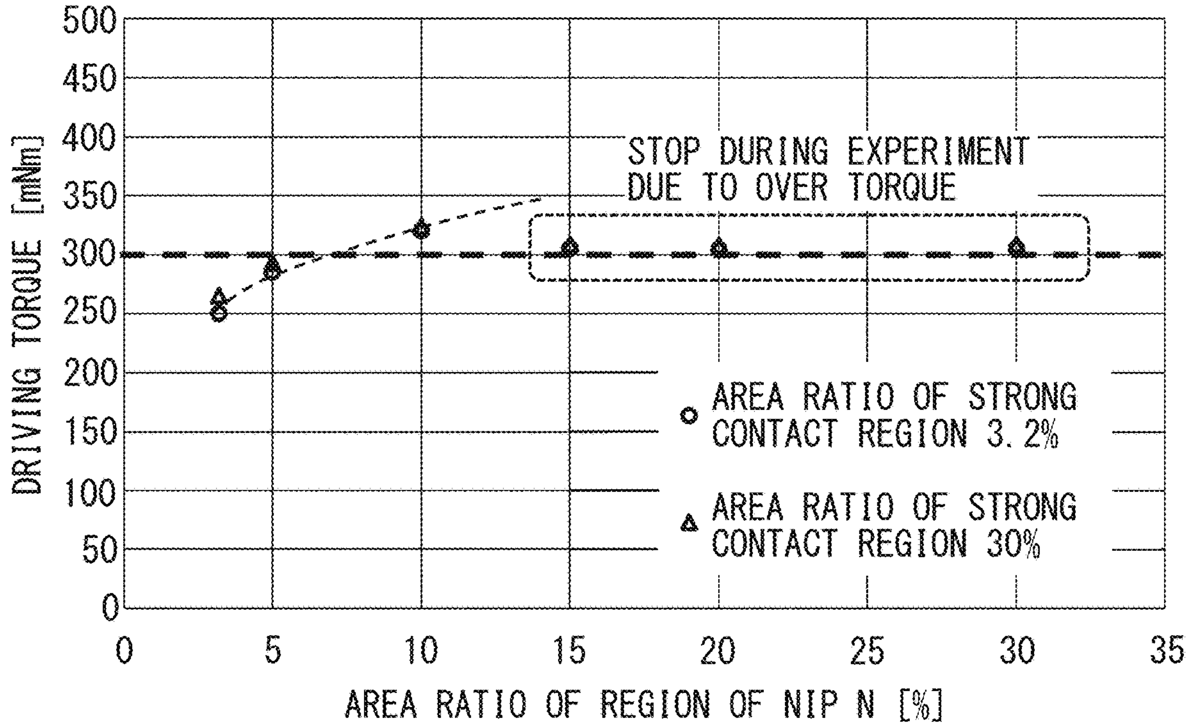

FIG. 9 is a graph showing results of the experiment for the sensitivity of the driving torque.

Figure 10:
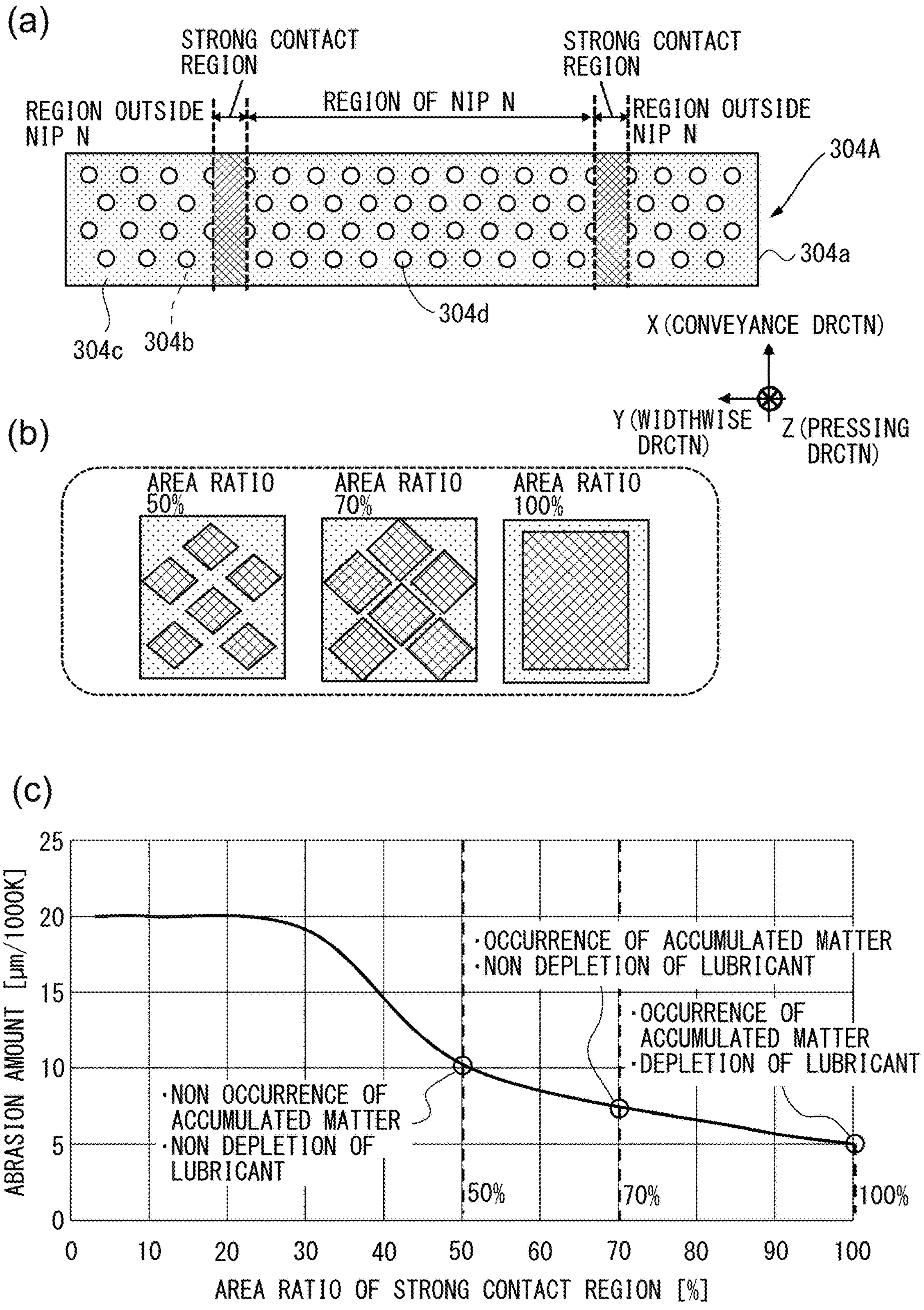

Part (a) of FIG. 10 is a schematic view illustrating each region on a surface of a sliding member according to an Embodiment 2, part (b) of FIG. 10 is a schematic view illustrating shapes of projections in three examples of the area ratio, and part (c) of FIG. 10 is a graph showing relationship between the area ratio of the strong contact region and the amount of wear according to the Embodiment 2.

DESCRIPTION OF THE EMBODIMENTS

Embodiment 1

An Embodiment 1 will be described using FIG. 1 through FIG. 9. First, an overall configuration of an image forming apparatus of the present Embodiment will be described using FIG. 1.

[Image Forming Apparatus]

An image forming apparatus 1 is a full-color printer of electrophotographic type, which is provided with four image forming portions Pa, Pb, Pc and Pd, which are provided correspondingly to four colors of yellow, magenta, cyan and black. In the present Embodiment, it is configured as a tandem type, in which the image forming portions Pa, Pb, Pc and Pd are disposed along a rotational direction of an intermediary transfer belt 204, which will be described below. The image forming apparatus 1 forms a toner image (an image) on a recording material corresponding to an image signal from an image reading portion (document reading apparatus) 2 connected to a main assembly of the image forming apparatus 3 or a host device such as a personal computer communicably connected to the main assembly of the image forming apparatus 3. Examples of the recording material include sheet material such as a paper, a plastic film and cloth.

The image forming apparatus 1 is provided with the image reading portion 2 and the main assembly of the image forming apparatus 3. The image reading portion 2 is what reads a document placed on a document table glass 21, and light emitted from a light source 22 is reflected by the document and an image is formed on a CCD sensor 24 via an optical system member 23 such as a lens. By scanning in a direction of a hollow arrow, such optical system unit converts the document into an electrical signal data sequence of each line. The image signal obtained by the CCD sensor 24 is sent to the main assembly of image forming apparatus 3, and an image processing tailored to each image forming portion is performed in a control portion 30, which will be described below. In addition, the control portion 30 also receives, as an image signal, an external input from an external host device such as a print server.

The main assembly of the image forming apparatus 3 is provided with the plurality of the image forming portions Pa, Pb, Pc and Pd, and in each image forming portion, image formation is performed based on the image signal described above. That is, the image signal is converted into a pulse width modulated (PWM) laser beam by the control portion 30. A polygon scanner 31 as an exposure device scans the laser beam, which corresponds to the image signal. Then, the laser beams are irradiated to photosensitive drums 200*a* through 200*d* as image bearing members for each of the image forming portions Pa through Pd.

Incidentally, Pa is the image forming portion for yellow color (Y), Pb is the image forming portion for magenta color (M), Pc is the image forming portion for cyan color (C), and Pd is the image forming portion for black color (Bk), and each forms an image of the corresponding color. Since image forming portions Pa through Pd are substantially the same, details of the image forming portion Pa for Y will be described below and the description for the other image forming portions will be omitted. In the image forming portion Pa, the toner image is formed on a surface of a photosensitive drum 200*a* based on the image signal, as described below.

A charging roller 201*a* as a primary charger charges the surface of the photosensitive drum 200*a* to a predetermined potential and prepares for an electrostatic latent image formation. By the laser beam from the polygon scanner 31, an electrostatic latent image is formed on the surface of the photosensitive drum 200*a*, which is charged to the predetermined potential. A developing unit 202*a* develops the electrostatic latent image on the photosensitive drum 200*a* and forms the toner image. A primary transfer roller 203*a* performs electric discharge from a back surface of the intermediary transfer belt 204 and applies a primary transfer bias having opposite polarity to toner to transfer the toner image, which is on the photosensitive drum 200*a*, to the intermediary transfer belt 204. For the photosensitive drum 200*a* after the transfer, the surface thereof is cleaned by a cleaner 207*a*.

In addition, the toner image on the intermediary transfer belt 204 is conveyed to a next image forming portion, in an order of Y, M, C and Bk, and the toner image of each color formed in each image forming portion is transferred sequentially, and an image of the four colors is formed on the surface thereof. Then, the toner image which has passed through the image forming portion Pd for Bk, which is disposed downstreammost in the rotational direction of the intermediary transfer belt 204, is conveyed to a secondary transfer portion, which is constituted by a secondary transfer roller pair 205 and 206. Then, in the secondary transfer portion, by a secondary transfer electric field having opposite polarity to the toner image on the intermediary transfer belt 204 being applied, the toner image is secondarily transferred to the recording material.

The recording material is accommodated in a cassette 9, and the recording material fed from the cassette 9 is conveyed to a registration portion 208, which is constituted by a pair of registration rollers, for example, and waits in the registration portion 208. After that, a timing is controlled to align positions the toner image on the intermediary transfer belt 204 and the sheet, and the registration portion 208 conveys the recording material to the secondary transfer portion.

The recording material, to which the toner image has been transferred in the secondary transfer portion, is conveyed to a fixing device 8, and in the fixing device 8, the toner image carried on the recording material is fixed to the recording material by being heated and pressed. The recording material which has passed through the fixing device 8 is discharged onto a discharge tray 7. Incidentally, in a case in which images are formed on both sides of the recording material, when the transfer and fixing of the toner image to a first surface (front surface) of the recording material is completed, the front and a back of the recording material are reversed through a reverse conveyance portion 10, the transfer and fixing of the toner image to a second side (back surface) of the recording material are performed, and the recording material is stacked on the discharge tray 7.

Incidentally, the control portion 30 performs control of the entire image forming apparatus 1 as described above. In addition, the control portion 30 is capable of various types of settings etc. based on an input from an operating portion 4 provided to the image forming apparatus 1. Such control portion 30 includes a CPU (Central Processing Unit), a ROM (Read Only Memory) and a RAM (Random Access Memory). The CPU performs control of each portion while reading programs corresponding to control procedures stored in the ROM. In addition, in the RAM, working data and input data are stored, and the CPU performs control with referring to the data stored in the RAM based on the aforementioned program, etc.

[Fixing Device]

Next, a configuration of the fixing device 8 will be described using part (a) and part (b) of FIG. 2. In the present Embodiment, a fixing device of a belt heating method using an endless belt is employed. In part (a) of FIG. 2, an X direction represents a conveyance direction of a recording material P (not shown in the figure), a Y direction represents a widthwise direction of the recording material crossing (perpendicular to, in the present Embodiment) the conveyance direction of the recording material, and a Z direction represents a pressing direction, which is a direction in which the recording material is pressed in a nip portion N. In the present Embodiment, the X direction, the Y direction and the Z direction are directions perpendicular to each other.

The fixing device 8 includes a fixing belt (hereinafter, "belt") 301, a stay 302, a pressing pad (hereinafter, "pad") 303, a sliding member 304, a pressing roller 305 and a heating roller 307, etc. The belt 301 is a rotatable heating member, which is endless and rotatable. The pressing roller 305 as a nip portion forming member is a rotatable pressing member, which contacts an outer peripheral surface of the belt 301 and forms the nip portion N for nipping and conveying the recording material between itself and the belt 301.

In the present Embodiment, a member which is a contact member contacting an inner peripheral surface of the belt 301 and slides relatively with the inner peripheral surface of the belt 301 is referred to as the sliding member 304. In the nip portion N, the inner peripheral surface of the belt 301 slides with respect to the sliding member 304. The pad 303 as a backup member is, inside the belt 301, disposed so as to nip the sliding member 304 and the belt 301 between itself and the pressing roller 305, and backs up the sliding member 304. The sliding member 304 is disposed so as to cover an outer peripheral surface of the pad 303 on the belt 301 side. The stay 302 is, inside the belt 301, disposed on an opposite side of the nip portion N with the pad 303 in between, and supports the pad 303. The heating roller 307 is disposed inside the belt 301 so as to stretch the belt 301 and heat the belt 301. Hereinafter, each configuration will be described in detail.

The belt 301 has thermal conductivity and heat resistance etc. and has a cylindrical shape of thin wall. In the present Embodiment, as shown in part (b) of FIG. 2, the belt 301 is configured to have a three-layer structure, in which a base layer 301*a*, an elastic layer 301*b* on an outer periphery of the base layer 301*a* and a releasing layer 301*c* on an outer periphery of the elastic layer 301*b* are formed. For the base layer 301*a*, for example, a thickness is 80 μm, and for material thereof, polyimide resin (PI) is used. For the elastic layer 301*b*, for example, a thickness is 300 μm and silicone rubber is used. For the releasing layer 301*c*, for example, a thickness is 30 μm and PFA (tetrafluoroethylene perfluoroalkoxyethylene copolymerization resin) as fluororesin is used. The belt 301 is stretched by the pad 303 and the heating roller 307, and tensile force applied to the belt 301 is configured to be 80 N in the present Embodiment. In addition, an outer diameter of the belt 301 is configured to be 150 mm in the present Embodiment.

The pad 303 is, inside the belt 301, disposed so as to be opposing to the pressing roller 305 across the belt 301, and forms the nip portion N for nipping and conveying the recording material between the belt 301 and the pressing roller 305. In the present Embodiment, the pad 303 is a member, which is long along a widthwise direction of the belt 301 (a longitudinal direction crossing a rotational direction of the belt 301, a rotational axis direction of the heating roller 307) and has an approximately plate shape. By the pad 303 being pressed against the pressing roller 305 across the belt 301, the nip portion N is formed. For material of the pad 303, LCP (liquid crystal polymer) resin is used. Between the pad 303 and the belt 301, the sliding member 304 is interposed. Details of the sliding member 304 will be described below.

The pad 303 is supported by the stay 302 as a supporting member, which is disposed inside the belt 301. That is, the stay 302 is disposed on an opposite side of the pad 303 to the pressing roller 305 and supports the pad 303. Such stay 302 is a reinforcing member, which is long along the longitudinal direction of belt 301 and has rigidity, and is in contact with the pad 303 and backs up the pad 303. That is, upon the pad 303 being pressed from the pressing roller 305, the stay 302 provides strength to the pad 303 and secures pressing force in the nip portion N.

The stay 302 is made of metal, such as stainless steel, and a cross section (crossing surface), which is perpendicular to the longitudinal direction of the stay 302 crossing the rotational direction of the belt 301, is approximately rectangular shape. For example, for the stay 302, a pultruded member of SUS304 (stainless steel) having a wall thickness of 3 mm is used, and by forming the cross section of the stay 302 into a hollow of an approximately rectangular shape, strength thereof is secured. Incidentally, the cross section of the stay 302 may be formed into the approximately rectangular shape by combining a plurality of sheet metals and fixing the sheet metals to each other by welding, etc. In addition, the material of the stay 302 is not limited to the stainless steel as long as the strength thereof can be guaranteed.

The heating roller 307 is disposed inside the belt 301 and stretches the belt 301 together with the pad 303. The heating roller 307 is formed of metal such as aluminum and stainless steel into a cylindrical shape, and inside the heating roller 307, a halogen heater 306 as a heating source for heating the belt 301 is provided. And the heating roller 307 is heated to a predetermined temperature by the halogen heater 306.

The heating roller 307 is also a steering roller which has a rotation center at one end portion in a longitudinal direction thereof or near a center thereof, and by being rotated with respect to the belt 301, a tension difference is generated between front and rear, thereby controlling a position in a main scanning direction of the belt 301. In addition, the heating roller 307 is urged by a spring supported by an unshown frame, and is also a tension roller, which provides a predetermined tensile force to the belt 301.

In the present Embodiment, the heating roller 307 is formed of, for example, a pipe made of stainless steel and having a thickness of 1 mm. In addition, the halogen heater 306 may be one, however, it is preferable to have a plurality of the halogen heaters 306 in view of temperature distribution control in the longitudinal direction (rotational axis direction) of the heating roller 307. The provided plurality of the halogen heaters 306 have lighting distribution, which differs from each other in the longitudinal direction, and a lighting ratio is controlled corresponding to a size of the recording material. In the present Embodiment, three halogen heaters 306 are disposed. Incidentally, the heating source is not limited to the halogen heater, but can also be other heaters, which are capable of heating the heating roller 307, for example, such as a carbon heater. The belt 301 is heated by the heating roller 307 heated by the halogen heater 306 and controlled to a predetermined target temperature corresponding to a type of the recording material based on temperature detection by an unshown thermistor (temperature detecting member).

The pressing roller 305 is also a rotatable driving member, which rotates with contacting the outer peripheral surface of the belt 301 and applies driving force to the belt 301. Incidentally, in the present Embodiment, the heating roller 307 is also rotationally driven by a driving source (for example, a driving motor), and applies driving force to the belt 301. However, the application of the driving force to the heating roller 307 may be omitted. The pressing roller 305 is a roller, in which a core metal (shaft) 305*c*, an elastic layer 305*b* on an outer periphery of the core metal 305*c*, and a releasing layer 305*a* on an outer periphery of the elastic layer 305*b* are formed. For the core metal 305C, for example, stainless steel having a diameter of 72 mm is used. For the elastic layer 305*b*, for example, conductive silicone rubber having a thickness of 8 mm is used. For the releasing layer 305*a*, for example, PFA (tetrafluoroethylene perfluoroalkoxyethylene copolymerization resin) as fluororesin having a thickness of 100 μm is used. The pressing roller 305 is rotatably supported by a frame of the fixing device 8 (not shown), and a gear is fixed to one end portion thereof, and the pressing roller 305 is rotationally driven by being connected to a driving source (e.g., a driving motor, not shown) via the gear.

The fixing device 8 heats the toner image in the nip portion N formed between the belt 301 and the pressing roller 305, while nipping and conveying the recording material P carrying the toner image. In this manner, the fixing device 8, while nipping and conveying the recording material P, fixes the toner image to the recording material P. Therefore, it is necessary for the fixing device 8 to work well in both functions of applying heat and pressure and of conveying the recording material P. By an unshown driving source, the pressing roller 305 is pressed against the sliding member 304 via the belt 301. In the present Embodiment, pressing force (NF) in the nip portion N during image formation is 1600 N, and it is configured so that a width in the X direction (conveyance direction of the recording material) of the nip portion Nis 24.5 mm, and a width in the Y direction (widthwise direction of the recording material) thereof is 350 mm.

[Sliding Member]

A detailed configuration of the sliding member 304 is shown in part (a) and part (b) of FIG. 3. Part (a) of FIG. 3 is a cross-sectional view of the sliding member 304 cut in the conveyance direction, and part (b) of FIG. 3 is a plan view of the sliding member 304 as seen from a contact surface side between the belt 301 and the sliding member 304. The sliding member 304 is fixed by a screw, etc. to the stay 302 via the pad 303. Incidentally, the sliding member 304 may be integrated with the pad 303. In addition, a part of the sliding member 304 may be fixed to the stay 302 and/or the pad 303. For example, both end portions in the Y direction (widthwise direction) of the sliding member 304 may be fixed to the pad 303 by screws, etc.

The sliding member 304 is constituted by a base material layer 304*a* and a sliding layer 304*c*. On a side of the base material layer 304*a* which slides with the belt 301, a plurality of projections 304*b*, which project toward the inner peripheral surface of the belt 301, are formed. The sliding layer 304*c* is provided so as to cover a surface on the side of the base material layer 304*a* which slides with the belt 301 (including the plurality of the projections 304*b*). Incidentally, a projecting portion formed by the projection 304*b* being covered by the sliding layer 304*c* is referred to as an embossed portion 304*d*.

The base material layer 304*a* only has to have sufficient heat resistance and strength. For material of the base material layer 304*a*, stainless steel, copper, aluminum, engineering plastics (PI (polyimide), PEEK (polyether ether ketone), LCP (liquid crystal polymer) etc.), etc. are desirable. In the present Embodiment, as the base material layer 304*a*, stainless steel having a thickness of 300 μm is employed.

The plurality of the projections 304*b* are provided from the base material layer 304*a* toward the inner peripheral surface of the belt 301. In addition, the plurality of the projections 304*b* are integrally formed with the base material layer 304*a* with the same material, and are arranged across the conveyance direction of the recording material (X direction) in the nip portion N and across the widthwise direction of the recording material crossing the conveyance direction (Y direction), respectively. A distance (interval) d between centers of adjacent projections 304*b* with respect to the conveyance distance and a distance (interval) d between the centers of adjacent projections 304*b* with respect to the widthwise direction are configured to be 1.4 mm or more, respectively. In addition, an area of a leading side surface of the projection 304*b* (emboss leading side shape area) S is configured to be 0.031 $mm^2$. In addition, the plurality of the projections 304*b* are distributed on the nip portion N and outside the nip portion N with respect to the widthwise direction.

In this manner, by providing the plurality of the projections 304*b* to the surface (sliding surface) of the sliding member 304 on the side which slides with the belt 301, the contact area between the sliding member 304 and the belt 301 is reduced and sliding resistance between the sliding member 304 and the belt 301 is reduced.

It is preferable that the sliding layer 304*c* be formed of a coating agent such as fluororesin (PTFE (polytetrafluoroethylene), PFA, etc.) to realize low friction. In the present Embodiment, the sliding member 304 is formed by coating PTFE having a thickness of 20 μm on the surface of the base material layer 304*a* including the plurality of the projections 304*b*. In addition, in the present Embodiment, lubricant is applied to the inner surface of the belt 301. As a result, the belt 301 has a configuration which slides smoothly with the sliding member 304. As the lubricant, silicone oil is used.

In addition, the sliding member 304 in the present Embodiment is configured to cover the pad 303 regardless of inside and outside the nip portion N. That is, except for a surface of the pad 303 on an opposite side to the nip portion N, an entire surface opposing to the belt 301 is covered by the sliding member 304. In addition, the plurality of the projections 304*b* are disposed in an entire region of the sliding member 304.

FIG. 4 shows, in the widthwise direction, positional relationship of the sliding member 304, the belt 301 and the pressing roller 305. In the present Embodiment, the relationship is configured that the sliding member 304 has a length of 370 mm in the widthwise direction, the belt 301 has that of 365 mm, the fixing roller 305 has that of 350 mm, and a length in the widthwise direction of the recording material P of a maximum size which the fixing device 8 can fix (maximum width, paper passable area) is 329 mm. Since the nip portion N (nip portion N region) is formed, as described above, by the pressing of the pressing roller 305, a length in the widthwise direction thereof matches the length in the widthwise direction of the pressing roller 305.

[on Early Wear Region of the Sliding Layer]

A graph in FIG. 5 shows a sensitivity of an amount of wear in the widthwise direction of the sliding layer 304*c*. A vertical axis of the graph represents a lost height (μm) of the sliding layer 304*c* due to wear upon 1000K (1000000) sheets of the recording material of A4 size, which is a lifetime number of sheets of the fixing device 8 in the present Embodiment, being passed through the nip portion. A horizontal axis represents a position in the widthwise direction. Incidentally, in FIG. 5, the positional relationship of the sliding member 304, the belt 301 and the pressing roller 305 shown in FIG. 4 is shown together with the graph.

According to the result of FIG. 5, it can be found that the sliding layer 304*c* in the nip portion N region remains until the lifetime number of sheets of the fixing device 8, however, in a part of a nip portion N outside region, which is a region outside the nip portion N in the widthwise direction (a portion in a predetermined region L sandwiched by broken lines in FIG. 5), the sliding layer 304*c* is lost. That is, the amount of wear reaches 20 μm, which is the thickness of the sliding layer 304*c*. Incidentally, the amount of wear shown in the result of FIG. 5 is calculated by averaging the embossed portions 304*d* for each row in the conveyance direction.

FIG. 6 is a view in which the part of the nip portion N outside region, in which the sliding layer 304*c* is lost, which is described in FIG. 5, is enlarged. As shown in FIG. 6, it is found that the belt 301, which is pushed up by the pressing roller 305 pressing the belt 301, upon being released from the region nipped by the nip portion N, bends in a pressing direction of the pressing roller 305 and strongly contacts locally with the sliding layer 304*c*. This region is referred to as a "strong contact region". Incidentally, since this strong contact with the sliding layer 304*c* occurs due to relationship between the pressing of the pressing roller 305 and the belt 301, even if the belt 301 is rotating in the direction in which the recording material is conveyed, as long as a pressing state of the pressing roller 305 continues, the strong contact keeps occurring in the same region in the widthwise direction.

Therefore, it is found that the embossed portions 304*d* disposed in this region keeps receiving strong contact force (hereinafter, referred to as a strong contact) from the belt 301, and the wear advances earlier than other regions. In addition, in the configuration of the fixing device in the present Embodiment, it is found that the strong contact is pronounced in a region from an end portion of the pressing roller 305 to 2.0 mm toward the nip portion N outside region.

Incidentally, in the description hereinafter, to the problem described above, an arrangement and shapes of the projections 304*b*, which are disposed in the strong contact region, will be described, however, the strong contact region is defined by positions in the widthwise direction of the pressing roller 305 and the sliding member 304 via the belt 301. Therefore, the strong contact region cannot be uniquely defined due to tolerance (play) for assembly in the widthwise direction of each part, which relates to formation of the strong contact region. For example, joining of the pressing roller 305 to the fixing device 8 in the widthwise direction is performed by being mounted to the unshown frame of the fixing device 8, however, it is permitted that the pressing roller 305 moves with respect to the frame of the fixing device 8 in the widthwise direction by a maximum of about 1 mm. Therefore, upon defining the strong contact region, it is assumed that this assembly tolerance is taken into account.

[Area Ratio]

In the present Embodiment, a countermeasure for the strong contact region of the belt 301 described above will be described. As shown in FIG. 6, the strong contact region is generated by the belt 301 strongly contacting the sliding member 304 due to the bending of the belt 301. Therefore, it can be considered that it is effective, by increasing an area ratio of embossed surfaces (leading side surfaces of the projections 304*b*) of the sliding member 304, which receive the force applied to the strong contact region, to reduce the contact pressure between the belt 301 and the embossed portions 304*d*.

FIG. 7 is a graph showing the amount of wear in cases in which the area ratio of a surface in which the sliding layer 304*c* in vicinity of the strong contact region of the belt 301 contacts the belt 301 with respect to the widthwise direction (a first area ratio, which will be described below) is varied. An amount of wear is shown as the lost height of the sliding layer 304*c* due to wear upon 1000K sheets of the recording material of A4 size, the same as described above, being passed through the nip portion N. An area ratio is calculated by an area of certain region of the sliding surface and sum of the areas of the leading side surfaces of all projections 304*b* included in that region, and is defined by the following equation.

$$Sa.r. = \sum_{i=1}^{n} \frac{Si}{SFR} \qquad \text{[Equation 1]}$$

Here, Sa.r. is the area ratio of the region, SFR is the area of the region, and Σ Si is the sum of the areas of the leading side surfaces (emboss leading side shape area) of the n projections 304*b* which exist in the region. In addition, in the surface on the side of the sliding member 304 which slides with the belt 301, a predetermined region outside the nip portion N in the widthwise direction is defined as a first region (strong contact region), and a region inside in the widthwise direction than the first region is defined as a second region (nip portion N region). The first region includes the region up to a position outside by 2 mm from the end portion in the widthwise direction of the nip portion N. The second region includes a region in the widthwise direction upon the recording material of the maximum size passing through the nip portion N. In addition, Sa.r. of the first region is defined as a first area ratio, and Sa.r. of the second region is defined as a second area ratio. In this case, the sliding member 304 in the present Embodiment is configured to satisfy the first area ratio>the second area ratio. By this, it becomes possible to reduce the contact pressure between the belt 301 and the embossed portions 304*d* in the strong contact region, and suppress that the wear of the sliding layer 304*c* advances earlier than assumption in the strong contact region.

In the experiment in FIG. 7, in the strong contact region, by increasing the number of projections 304*b* by reducing the distance between the centers of adjacent projections 304*b* (distance between embossed shapes) d, the area ratio is varied, and the amount of wear in each case is examined. In addition, in the present Embodiment, the projection 304*b*, which constitutes the embossed portion 304*d*, is manufactured by chemical etching. In this case, if the distance between embossed shapes d is narrower than 0.35 mm, the adjacent projections 304*b* are too close to each other, and a phenomenon, in which the projections 304*b* adhere to each other upon manufacturing, begins to occur. When the adjacent projections 304*b* adhere to each other, a problem caused by spaces between the projections 304*b* being eliminated arises. For example, drifted material such as worn powder of the sliding layer 304*c*, which is worn by use, may be trapped and deposited at the location, causing absorption of the lubricant and blocking of flow paths, and partial depletion of the lubricant may occur. In addition, the deposited and enlarged foreign matter itself exerts strain stress to the belt 301, and in some cases, causing the belt 301 to break within the lifetime of the fixing device 8.

For this reason, under conditions of an emboss leading side shape area S being kept constant and the distance between embossed shapes d being 0.35 mm, the area ratio of 50% is configured as an upper limit in the present condition. As it is clearly seen from FIG. 7, in a case in which the first area ratio is less than 30%, the amount of wear does not change from 20 [μm/1000K]. This means that the sliding layer 304*c* is worn and lost within the lifetime of the fixing device 8. On the other hand, when the first area ratio is 30% or more, reducing of the amount of wear appears and it is confirmed that the sliding layer 304*c* remains. This is due to a fact that by an increase of the area ratio, the region of the embossed portions 304*d*, which supports the belt 301, increases, and upon the belt 301 contacting each embossed portion 304*d*, contact pressure applied to a single embossed portion 304*d* is reduced. Therefore, in the present Embodiment, it is found that, by configuring the first area ratio to be 30% or more, it becomes possible to prevent the sliding layer 304*c* from being lost within the lifetime of the fixing device 8.

As described above, by increasing the first area ratio, it becomes possible to suppress the amount of wear of the sliding layer 304*c*, and it is preferable that the first area ratio is configured to be 30% or more. Therefore, it is desirable to increase the area ratio in all regions, not just in the strong contact region, however, from an experimental result which will be described below, it has been found that there is the upper limit to the area ratio from a viewpoint of an increase in driving torque generated by sliding between the belt 301 and the embossed portions 304*d*.

Next, an experiment for sensitivity of the driving torque will be described. The experiment is conducted under the following conditions. Part (a) of FIG. 8 is a schematic view illustrating each region in the sliding surface of the sliding member 304 used in the present experiment. In addition, part (b) of FIG. 8 is a table showing conditions of the sliding member 304 used in the experiment for the sensitivity of the driving torque. In the present experiment, by setting the emboss leading side shape area S constant at 0.031 $mm^2$ and varying the distance between the embossed shapes d from 1.4 mm to 0.45 mm, the area ratio in the strong contact area (the first area ratio) is set to two levels of 3.2% and 30%, and on each level of the area ratio of the strong contact area, the sliding members 304 in which the area ratios of the nip portion N region (second area ratio) are varied from 3.2% to 30% are prepared.

The experiment for the sensitivity of the driving torque is conducted in a mode in which the pressing roller 305 alternately repeats a state of contacting the belt 301 and a state of non-contact, and a designed target time in this mode is set to 240 hours. In a case in which the driving torque exceeds 300 mNm, which is a preset upper limit value for the experiment, within the designed target time, then the experiment is terminated even if it is in the middle of the experiment, and in a case in which the driving torque does not exceed the upper limit value for the experiment within the designed target time, then the experiment is terminated after the designed target time elapsed.

Incidentally, the upper limit value for the experiment for the driving torque described above is set at 300 mNm as a threshold value, in which there may be occurrence of image defect due to slippage and occurrence of breakage of the driving gear. In addition, the experiment is conducted as viscosity of the lubricant n is set to 1000 $mm^2/s$, and a conveyance speed of the recording material v is set to 435 mm/s.

FIG. 9 shows results of the experiment for the sensitivity of the driving torque described above, where a horizontal axis represents the area ratio of the nip portion N region (second area ratio) and a vertical axis represents a driving torque value. In addition, two profiles are the results in cases in which the area ratios in the strong contact region (first area ratio) are 3.2% and 30%, respectively. With the configuration in the present Embodiment, a lubricating layer of the lubricant formed between the belt 301 and the embossed portion 304*d* is a mixed lubrication, and it has a relation that, by an amount in which the contact area increases, sliding resistance increases and the driving torque rises. Furthermore, as use of the device is continued, the sliding layer 304*c* of the embossed portions 304*d* wears, and an area of the sliding surface between the belt 301 and each embossed portion 304*d* gets increased. In light of these, referring to the present results, it is confirmed that when the area ratio of the nip portion N region exceeds 5%, the driving torque exceeds the threshold value of 300 mNm.

Incidentally, with respect to a difference in the area ratio of the strong contact region, it is also found that effect on the driving torque is minimal because there is no pressing from the pressing roller 305 since the region is the nip portion N outside region and ratio of the area relative to the entire sliding member 304 is small.

As described above, it is found that it is desirable that the area ratio in the nip portion N region does not exceed 5% from the viewpoint of the driving torque, and the area ratio in the strong contact region is 30% or more from the viewpoint of retaining the sliding layer 304*c* of the embossed portion 304*d* within the lifetime of the fixing device 8. That is, it is found that it is preferable that the first area ratio is configured to be 30% or more, and the second area ratio is configured to be 5% or less. By this, it becomes possible, while suppressing the rising of the driving torque, to retain the sliding layer 304*c* in the strong contact region within the lifetime of the fixing device 8, thereby suppressing shortening of the lifetime of the fixing device 8.

Incidentally, in the description above, explanation has been made by using the area ratios of the first region (strong contact region) and the second region (nip portion N region), however, the same is true when using a mean area as described below. That is, when a mean of the areas of the leading side surfaces of the projections 304*b* in the first region is defined as a first mean area, and a mean of the areas of the leading side surfaces of the projections 304*b* in the second region is defined as a second mean area, the sliding member 304 is configured so as to satisfy the first mean area>the second mean area. In this case as well, as in the case described with the area ratio, it becomes possible to reduce the contact pressure between the belt 301 and the embossed portion 304*d* in the strong contact region, and suppress that the wear of the sliding layer 304*c* advances earlier than assumption in the strong contact region.

Embodiment 2

An Embodiment 2 will be described using part (a) through part (c) of FIG. 10. In the Embodiment 1 described above, by increasing the number of embossed portions 304*d* (i.e., the number of projections 304*b*) disposed in the strong contact portion, improvement of lifetime of the sliding layer is achieved. However, as described above, with the method of increasing the number of the embossed portions 304*d* (in other words, increasing density of embossed portions 304*d* in the region), the area ratio has the upper limit of about 50%. Therefore, in the present Embodiment, for further improvement of lifetime of the sliding layer, by changing the shape of each projection 304*b* and performing optimal arrangement, the area ratio of 50% or more in the strong contact region is aimed. Since other configurations and actions are the same as those in the Embodiment 1 described above, the same reference numerals will be attached to the same configurations to omit or simplify the description and illustration, and hereinafter, description will focus on points which differ from those of the Embodiment 1.

Part (a) of FIG. 10 is a schematic view illustrating each region in a sliding surface of a sliding member 304A according to the present Embodiment. Incidentally, in part (a) of FIG. 10, a shape of projection 304*b* in the regions (including the nip portion N region) other than the strong contact region (first region) is illustrated as a circle, however, as shown in part (b) of FIG. 10, the shape of the projection 304*b* in the strong contact region may be configured to be a rhombus, for example. Incidentally, the shapes of the projections 304*b* other than the strong contact region may be configured to be the same as the projections 304*b* in the strong contact region. However, in both cases in which the shapes of the projections 304*b* in the strong contact region and the shapes of the projections 304*b* in the regions other than the strong contact region are configured to be the same or different, it is configured to satisfy the first area ratio>the second area ratio.

Part (b) of FIG. 10 is a schematic view illustrating an example in which the arrangement and the shapes of the projections 304*b* in the strong contact region are optimized in terms of the area ratio, and the shapes of the projections 304*b* in the present Embodiment have, for example, "the area ratio of 50%" or "the area ratio of 70%". In part (b) of FIG. 10, as a reference, "the area ratio of 100%" is also illustrated. 100%, which is the maximum area ratio, means that the distance between embossed shapes d is 0, i.e., the embossed shapes are configured to be a plane shape. Part (c) of FIG. 10 illustrates a graph in which, under an assumption that the arrangement and the shapes of the projections 304*b* in the strong contact region are configured as shown in part (b) of FIG. 10, the same experiment as in FIG. 7 is conducted and results thereof are additionally plotted.

It is clearly seen from part (c) of FIG. 10, in a case in which the area ratio is 100%, the amount of wear becomes also a minimum of 5 [μm/1000K]. However, in the case of the condition in which the area ratio is extremely large, such as the area ratio of 100%, i.e., in the case in which the distance between embossed shapes d is zero or minimal, the space between the embosses is eliminated. If this happens, foreign matter such as worn powder which normally flows with the lubricant through the gap between the embosses is dammed up at an entrance portion and/or an embossed region portion. By the dammed foreign matter being accumulated, the absorption of the lubricant and blocking of the flow paths may occur, and the partial depletion of the lubricant may occur. In addition, the deposited and enlarged foreign matter itself exerts strain stress to the belt 301, and in some cases, causing the belt 301 to break within the lifetime of the fixing device 8.

In the present experiment, in the result of the area ratio of 50%, there is no occurrence of the deposit, and the depletion of the lubricant does not occur, either. In addition, in the result of the area ratio of 70%, the occurrence of the deposit is slight, and the depletion of the lubricant does not occur. In the experimental result in the area ratio of 100%, there is an occurrence of the deposit having a large size and the depletion of the lubricant also occurs.

As described above, it is found that, by increasing the area ratio, it becomes possible to suppress the wear of the sliding layer 304*c*, and improve the lifetime of the fixing device 8. For example, it is preferable that the area ratio is configured to be 50% or more. However, as described above, upon taking into consideration unexpected damage to the belt 301 due to the partial depletion of the lubricant and accumulation of the foreign matter such as the worn powder, it is preferable to configure the area ratio to be 70% or less. In a case of such present Embodiment, by optimizing the arrangement and the shapes of the projections 304*b*, and by configuring the area ratio in the strong contact region to be, for example, 50% or more, further improvement of the lifetime of the fixing device 8 becomes possible. Incidentally, the shape of the projection 304*b* in the strong contact region is not limited to the rhombus as shown in part (b) of FIG. 10, but, as long as the area ratio can be increased, can be configured to be various shapes such as a triangle and a hexagon.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2024-030722 filed on Feb. 29, 2024, which is hereby incorporated by reference herein in its entirety.

What is claimed is:

1. A fixing device for fixing a toner image carried on a recording material to the recording material, the fixing device comprising:

an endless and rotatable belt;

a rotatable pressing member configured to contact an outer peripheral surface of the belt and form a nip portion for nipping and conveying the recording material between itself and the belt; and a contact member configured to contact an inner peripheral surface of the belt in the nip portion, wherein the inner peripheral surface of the belt slides with the contact member, wherein the contact member includes a plurality of projections provided on a side where the contact member slides with the belt and so as to project toward the inner peripheral surface of the belt, the plurality of the projections distributing on the nip portion and outside the nip portion with respect to a widthwise direction of the recording material crossing a conveyance direction of the recording material, wherein in a region where the projections of the contact member exist, a predetermined region outside the nip portion in the widthwise direction crossing the conveyance direction of the recording material is defined as a first region and a region inside the first region in the widthwise direction and in the nip portion is defined as a second region, and wherein an area ratio of a contacting area where the belt and the plurality of the projections are in contact with each other in the first region to an area of the first region is larger than an area ratio of a contacting area where the belt and the plurality of the projections are in contact with each other in the second region to an area of the second region.

2. The fixing device according to claim 1, wherein the area ratio of the contacting area where the belt and the plurality of the projections are in contact with each other in the first region to the area of the first region is 30% or more.

3. The fixing device according to claim 1, wherein the area ratio of the contacting area where the belt and the plurality of the projections are in contact with each other in the second region to the area of the second region is 5% or less.

4. The fixing device according to claim 1, wherein the area ratio of the contacting area where the belt and the plurality of the projections are in contact with each other in the first region to the area of the first region is 70% or less.

5. The fixing device according to claim 1, wherein the second region includes a region in the widthwise direction through which a recording material with a maximum size passes.

6. The fixing device according to claim 1, wherein the contact member includes a base material layer formed of a metal.

7. The fixing device according to claim 6, wherein the plurality of the projections are provided toward the inner peripheral surface of the belt from the base material layer and are integrally formed with the base material layer.

8. The fixing device according to claim 7, wherein the contact member includes a sliding layer configured to cover a surface including the plurality of the projections and on a side where the contact member slides with the belt.

9. The fixing device according to claim 8, wherein the sliding layer is made of fluororesin.

10. The fixing device according to claim 1, wherein the first region includes a region to a position outside by 2 mm from an end portion of the nip portion in the widthwise direction.

11. The fixing device according to claim 1, wherein the pressing member is a pressing roller configured to press the belt toward the contact member.

12. The fixing device according to claim 1, further comprising a heating roller in contact with the inner peripheral surface of the belt, and a heat source configured to heat the heating roller.

13. The fixing device according to claim 1, wherein the projections of the first region and the projections of the second region are different in shape from each other.

14. The fixing device according to claim 13, wherein the shape of the projections of the second region is a polygon.

15. The fixing device according to claim 13, wherein the contacting area per unit area where the belt and the plurality of the projections are in contact with each other in the first region is a first area, and wherein the contacting area per unit area where the belt and the plurality of the projections are in contact with each other in the second region is a second area different from the first area.

* * * * *